(No Model.)
G. F. NEWELL.
Feeding Mechanism for Sewing Machines.
No. 237,666.          Patented Feb. 8, 1881.
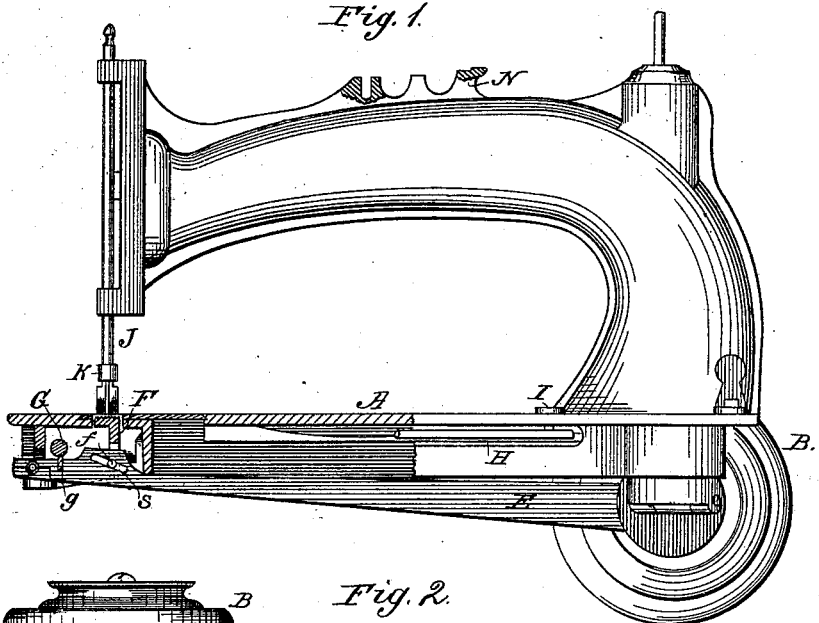
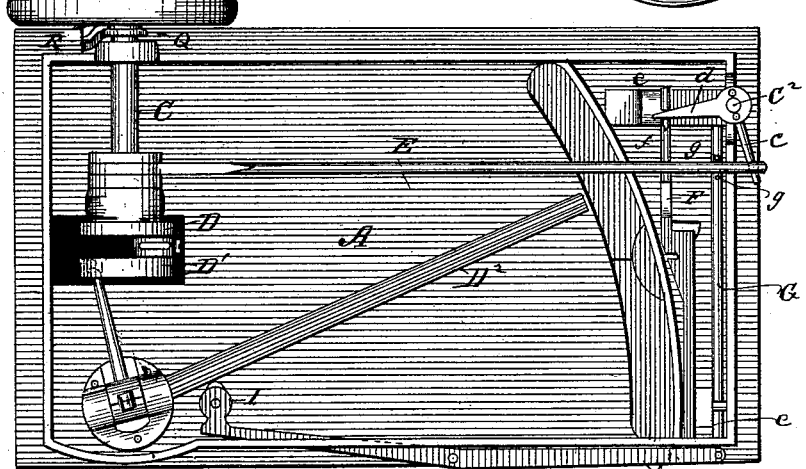
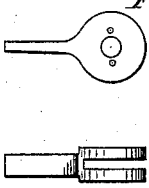
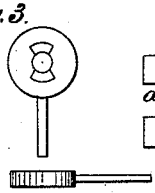
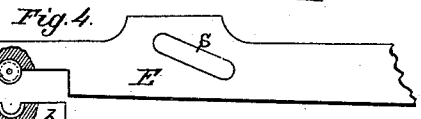
WITNESSES:
INVENTOR:
G. F. Newell
BY
ATTORNEYS.

UNITED STATES PATENT OFFICE.

GEORGE F. NEWELL, OF GREENFIELD, MASSACHUSETTS.

FEEDING MECHANISM FOR SEWING-MACHINES.

SPECIFICATION forming part of Letters Patent No. 237,666, dated February 8, 1881.

Application filed June 8, 1880. (No model.)

*To all whom it may concern:*

Be it known that I, GEORGE F. NEWELL, a citizen of the United States, residing at Greenfield, in the county of Franklin and State of Massachusetts, have invented a new and Improved Sewing-Machine Feed, of which the following is a full, clear, and exact specification, reference being had to the drawings hereto annexed, in which—

Figure 1 is a side view of a sewing-machine embodying my feed, the view being in section through the line $x\ x$ of Fig. 2. Fig. 2 is a reverse-plan view of the work-plate and the mechanism thereto secured; Fig. 3, details of the elbow-crank mechanism; and Fig. 4 is a detail of the rod operating the elbow-crank.

My invention is an improvement on that form of sewing-machine feeds in which a longitudinally-reciprocating rod or bar is arranged at right angles to the feed-bar and imparts motion to the latter through an elbow-lever or bell-crank. The requisite functions of a sewing-machine feed are to raise and lower the feed-bar, to push it forward and backward, to allow it an interval of rest, and to shorten or lengthen the stitch.

My invention consists in the peculiar construction and arrangement of devices for accomplishing these results, as will be hereinafter more fully described, and pointed out in the claims.

In the drawings, A represents the work-plate, beneath which, in hangers, is arranged at one end the transverse drive-shaft C, carrying hand-wheel B, with drive-pulley. This drive-shaft extends about half-way across the work-plate, and carries at its end two disks, D D', connected by a pin, through which motion is transmitted to the lever driving the needle-bar, and the outer of which disks is connected with the shuttle-driving arm $D^2$, as shown, and all as fully described and claimed in my prior application for a patent, which was filed January 13, 1880, and allowed on the 20th day of April, 1880.

For effecting the feed I attach, at right angles to the drive-shaft C, an eccentric-rod, E, or a rod whose end next to the shaft has a rotary movement, so that said rod is reciprocated longitudinally and also moved up and down, and this rod extends to the end of the work-plate opposite the shaft C. In the end of this eccentric-rod is arranged a perforated ball, $a$, Fig. 4, moving loosely in a socket in the end of said rod and retained in place by a detachable section, $b$, of the rod. Through the opening in this ball there extends arm $c$, Fig. 2, connected to the arm $d$, and working with it upon the same center, like an elbow-lever. These two arms are not, however, rigidly connected, but are connected by pins $c'$ and slots $d'$, as shown in Fig. 3, so that there is a slight play between the two. The arm $c$, being oscillated about the center $c^2$, Fig. 2, by the eccentric-rod, it will be seen that it also oscillates arm $d$. Now, this latter arm has its extremity seated in a notch in the feed-bar F, and when the rod E reciprocates the arms $c$ and $d$ oscillate, and the feed-bar F is reciprocated thereby. This feed-bar is held in suitable guides $e\ e$, and carries upon its upper surface a roughened face, which moves back and forth in a slot in the work-plate, as usual. When this roughened face is moved forward it is required to be elevated, and when on the backward move it should be depressed. To effect this the outer end of the eccentric-rod, where it crosses the feed-bar, is slotted obliquely, as shown at $s$ in Fig. 1, and the feed-bar has a horn, $f$, Figs. 1 and 2, which projects through said slot, and the inclination of this slot is such that when the eccentric-rod is exerting a pull on the arm $c$ to advance the feed-bar the inclined slot, in passing over the horn of the feed-bar, raises it to give the required elevation, while for the alternate movement the reverse action takes place. This result is also assisted by the leverage movement of the eccentric-rod in vibrating about the arm $c$ as a center.

To vary the length of the feed, the outer end of the eccentric-rod is adjusted on the arm $c$, being thrown in toward the center for a long stich, and out from the center for a short stitch. This is effected as follows: G is a longitudinally-sliding adjusting-bar, arranged transversely in suitable guides in the end of the work-plate, and having two downwardly-projecting pins, $g\ g$, which embrace the end of the eccentric-rod, like a fork. One end of this bar projects to near the edge of the work-plate, and is there jointed to the adjusting-lever H, which extends nearly the whole length of the work-plate, in position longitudinally therewith, and is provided with a set-screw, I, Figs. 1 and 2, that passes through a curved slot in the work-plate. Now, by adjusting this setscrew in the slot, it will be seen that the lever H is moved on its fulcrum, the adjusting-bar G is slid longitudinally, and the outer end of the eccentric-rod is thrown closer in to or farther out from the center of oscillation of arm c to lengthen or shorten the stitch.

From the foregoing description it will be seen that the back-and-forth movement of the feed-bar F is effected through the longitudinal movement of rod E and the oscillating movement of the elbow-lever. The interval of time in the back-and-forth movement is supplied by the pins $c'$ and slot $d'$, forming the loose joint of the elbow-lever. The up-and-down movement of the feed is effected partly by the slot $s$ in rod E, and partly by the up-and-down movement of the rod E acting on horn $f$ of the feed-bar, while the adjustment of the length of the stitch is effected through bar G and lever H.

Having thus described my invention, what I claim as new is—

1. The combination of the feed-bar F, the rod E, arranged at right angles to the feed-bar, an elbow-lever connecting said feed-bar and rod, and the rotary shaft C, having an eccentric connection with the said rod, the said rod E having a slot, $s$, and connected to one of the arms of the elbow-lever as a pivotal point, and the feed-bar, having a horn, $f$, passing through the slot $s$ of the rod E, substantially as and for the purpose described.

2. The combination, with a reciprocating rod, mechanism for operating it, and the feed-bar, arranged at right angles to the reciprocating rod, of an elbow-lever connecting the reciprocating rod and feed-bar, and constructed of two arms having a limited free movement at their centers of oscillation, as described.

3. The combination, with the reciprocating rod E, the mechanism for operating it, and the feed-bar F, of an elbow-lever, $c$ $d$, connecting the feed-bar and rod E, the arm $c$ of the elbow-lever and the rod E being connected by a perforated ball, $a$, sliding freely on the arm $c$ and swiveling loosely in the rod E, as shown and described.

GEORGE F. NEWELL.

Witnesses:
JOHN H. AMIDON,
DWIGHT B. KELLOGG.